Jan. 27, 1942.　　　O. J. ANDERSON　　　2,270,861
MACHINE TOOL
Filed May 1 1941　　　2 Sheets-Sheet 1

INVENTOR
Oscar J. Anderson
By Parker, Carlson, Pitzner & Hubbard
ATTORNEYS

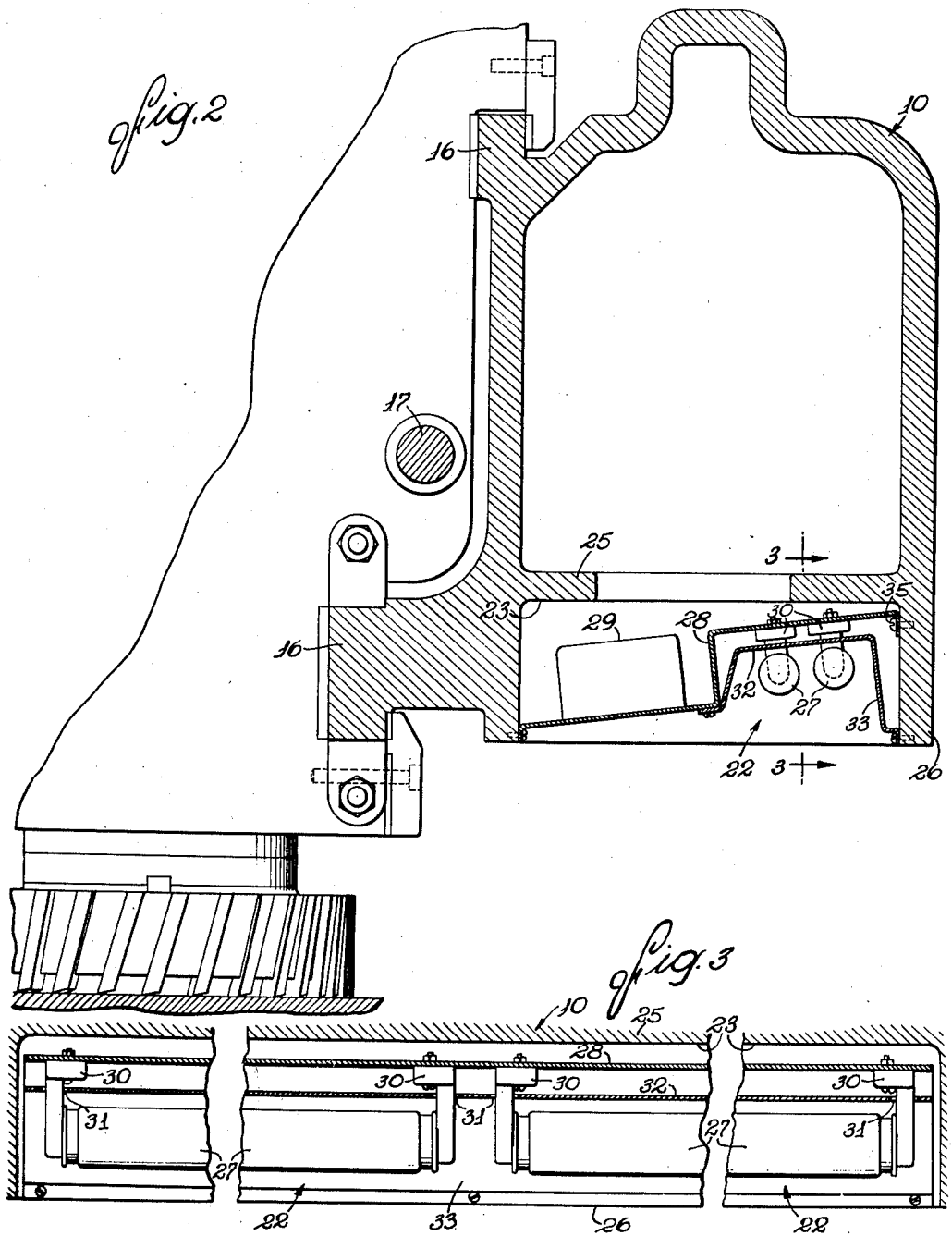

Patented Jan. 27, 1942

2,270,861

UNITED STATES PATENT OFFICE 2,270,861

MACHINE TOOL

Oscar J. Anderson, Rockford, Ill., assignor to The Ingersoll Milling Machine Company, Rockford, Ill., a corporation of Illinois Application May 1, 1941, Serial No. 391,402

3 Claims. (Cl. 90—11)

This invention relates to machine tools of the type having a horizontal work table and a tool head slidable along ways on a frame member, either a vertical column or a crossrail, to adjust the cutter position or to mill various portions of a workpiece on the table.

The object of the invention is to provide illuminating means mounted in the tool supporting member in a novel manner such as to be fully protected against mechanical injury and to direct light onto the cutter and work in the various positions of the tool.

Other objects and advantages of the invention will become apparent from the following detailed description taken in connection with the accompanying drawings, in which Figure 1 is a front elevational view of a crossrail milling machine embodying the novel features of the present invention.

Fig. 2 is a section taken along the line 2—2 of Fig. 1.

Fig. 3 is a section taken along the line 3—3 of Fig. 2.

Figure 1:
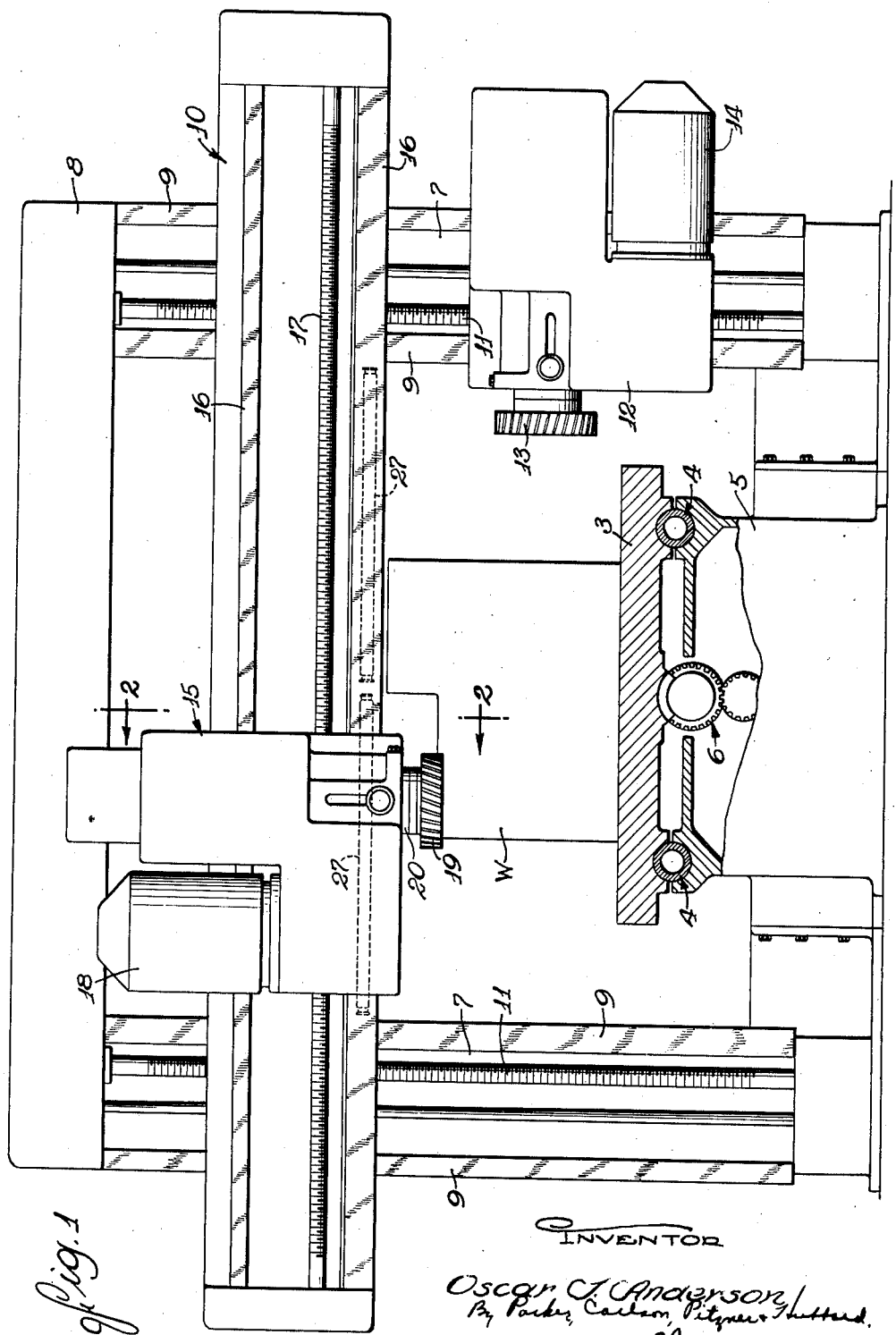

Milling machines and planers of the type shown in the drawings include a work table 3 supported for horizontal reciprocation by ways 4 on an elongated bed 5 on which is mounted mechanism indicated at 6 for feeding the table back and forth. Bridging the table is a frame comprising vertical columns 7 rigidly connected at their lower ends to the bed 5 and at the upper ends by a bridge 8. The front face of each column is formed with a pair of spaced parallel ways 9 on which slides a horizontal frame member or crossrail 10 which may be raised and lowered as desired by rotating feed screws 11. In the case of a milling machine, a tool head 12 is also mounted on one or both of the columns 7. This head is slidable along the ways 9 and carries a cutter 13 driven by a motor 14 and facing horizontally so as to be operable on the vertical side of a workpiece supported on the table.

A similar head 15 carrying a tool 19 is slidable horizontally along ways 16 on the front of the rail 10 being moved back and forth by a suitable feed mechanism including a screw 17. If the tool is a milling cutter a motor 18 on the head drives a cutter 19 facing downwardly and carried on the end of a quill 20 that may be raised and lowered in the usual way.

In machines of the above character, the upper frame members, that is, the rail 10 and the columns 7, are usually of hollow construction, and the ways 9 and 16 are disposed on the front of the column and rail so that the side of each frame member adjacent the work table is free and open. The present invention takes advantage of the foregoing inherent characteristics to provide for effective illumination of each cutter, when acting on a workpiece, in all of its positions of adjustment along its supporting frame member and for effective protection of the illuminating means as an incident to setting up the work on the table, traversing of the rail, adjustment of the heads along their guideways, and actual machining of the work.

To the foregoing ends, the side of the frame member facing the work table is recessed and provides a housing for illuminating means arranged along the supporting frame member to direct the major portion of its light rays toward the associated cutter. Herein, the illuminating means indicated generally at 22 is applied to the crossrail 10 which is cast with a downwardly opening recess 23 herein of generally rectangular cross-section and disposed below a web 25 and between the way 16 and a flange 26 which extends to the same level as the way 16. The recess extends longitudinally substantially throughout the length of the rail.

In the present instance, the illuminating means 22 comprises electric lamps 27 in the form of elongated tubes preferably of the fluorescent type. These are arranged parallel to each other within the rail recess 23 with their sockets carrying members 30 fastened to a Z-shaped plate 28. Screws 35 spaced along the rear edge of the plate near the web 25 secure the plate to the flange 26. Thus, the lamps are supported in the rear portion of the rail recess 23 and above the lower edges of the way 16 and the flange 26.

The forward edge portion of the plate 28 is disposed at a lower level and is attached to the way 16. In the space above this portion is mounted the auxiliary equipment indicated at 29 by which operation of the fluorescent lamps 27 is initiated. The socket members 30 which support opposite ends of the lamp bulbs project downwardly through openings 31 in a plate 32 attached along opposite edges to the flange 26 and the plate 28 and having one surface 33 disposed generally vertically but inclined forwardly at its upper end and coated so as to constitute a reflector.

It will be observed that the illuminating means is disposed in an out of the way position within the crossrail 10 so as not to interfere in any way with the normal operation of setting up the work on the table, traversing the work past the cutter and beneath the rail, raising and lowering the rail and moving the head 13 along the rail. The lamps being located immediately behind and above the cutter and in the rear portion of the rail recess 23, their rays will be directed onto the cutter and the portion of the work being operated upon, and this, in spite of the fact that the rays must be directed downwardly. Thus, the cutter and work are illuminated by rays emanating directly from the lamps and also by rays deflected from the surface 33. In the location shown, the lamps, being disposed in the rail recess 23 and above the lower edges of the way 16 and the flange 26, are protected fully against mechanical injury or displacement. There is no danger of the lamps being struck by any workpiece moving past the rail 10 even though a portion of the workpiece may, as shown in Fig. 1, be above the cutter.

This application discloses certain of the subject matter contained in my former application Serial No. 333,577, filed May 6, 1940.

I claim as my invention:

1. A machine tool of the character described having, in combination, a horizontal work table, a crossrail disposed above said table and having a downwardly opening recess along its under side, a tool head disposed in front of and slidable along said rail, a cutter on said head projecting downwardly, illuminating means extending along the under side of said rail to direct light toward said cutter, and means disposed in said recess above the level of the lower edge of said rail and supporting said illuminating means in the recess above said lower edge so that said illuminating means and its supporting parts are mechanically protected by said rail against workpieces passed beneath the rail.

2. A machine tool of the character described having, in combination, a horizontal work table, an elongated stationary frame member adjacent said table having a recess in the side facing toward the table, a tool head disposed in front of and slidable along said member, a cutter on said head projecting toward said table, and illuminating means and supporting means therefor disposed wholly within the said recess so as to be protected mechanically by said frame member while directing light toward and onto said cutter and the work engaged thereby.

3. A machine tool of the character described having, in combination, a horizontal work table, a crossrail disposed above said table and having a downwardly opening recess in its underside, a tool head disposed in front of said rail and carrying a cutter disposed below said recess, and illuminating means housed in said recess near the rear side and above the lower edge thereof so as to be protected mechanically by said rail and to direct light forwardly and downwardly onto said cutter and the work engaged thereby.

OSCAR J. ANDERSON.